(12) United States Patent
Langholz et al.

(10) Patent No.: US 11,371,831 B2
(45) Date of Patent: Jun. 28, 2022

(54) METHOD FOR DETERMINING THE THICKNESS AND REFRACTIVE INDEX OF A LAYER USING A SHAPE FEATURE DURING ANALYSIS

(71) Applicant: Carl Zeiss Microscopy GmbH, Jena (DE)

(72) Inventors: Nils Langholz, Apolda (DE); Jakob Haarstrich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 9 days.

(21) Appl. No.: 17/260,356

(22) PCT Filed: Jul. 17, 2019

(86) PCT No.: PCT/EP2019/069211
§ 371 (c)(1),
(2) Date: Jan. 14, 2021

(87) PCT Pub. No.: WO2020/016284
PCT Pub. Date: Jan. 23, 2020

(65) Prior Publication Data
US 2021/0293530 A1   Sep. 23, 2021

(30) Foreign Application Priority Data

Jul. 19, 2018  (DE) .................... 10 2018 117 470.5

(51) Int. Cl.
*G01B 11/06*    (2006.01)
*G01B 9/04*     (2006.01)
(Continued)

(52) U.S. Cl.
CPC ............ *G01B 11/0616* (2013.01); *G01B 9/04* (2013.01); *G01N 21/41* (2013.01); *G01N 2021/4126* (2013.01); *G02B 21/0024* (2013.01)

(58) Field of Classification Search
CPC ............ G02B 21/0052; G02B 21/0024; G02B 21/0016; G01B 11/06; G01B 9/04; G01B 11/0616; G01N 2021/4126
See application file for complete search history.

(56) References Cited

U.S. PATENT DOCUMENTS

| 5,943,134 A | 8/1999 | Yamaguchi et al. | |
|---|---|---|---|
| 2003/0090671 A1* | 5/2003 | Takahashi | G01B 11/06 257/E21.53 |

(Continued)

FOREIGN PATENT DOCUMENTS

| CN | 1725039 A | 1/2006 |
|---|---|---|
| CN | 101957181 A | 1/2011 |

(Continued)

OTHER PUBLICATIONS

International Search Report for International Application PCT/EP2019/069211 dated Oct. 29, 2019.
(Continued)

*Primary Examiner* — Michael P LaPage
(74) *Attorney, Agent, or Firm* — Duane Morris LLP

(57) ABSTRACT

The invention relates to a method for determining the thickness and refractive index of a layer (6) on a substrate (26). The layer (6) having a layer boundary surface (30) facing the substrate (26) and a layer top side (28) facing away from the substrate (26). In said method, the following steps are performed; imaging the layer (6), by confocal microscopy, along an optical axis (8), determining a point spread function resolved along the optical axis (8) al the layer boundary surface (30) and the layer lop side (28), determining an apparent thickness of the layer at a lateral point of the layer from the distance between two maxima of the point spread function, determining the widening of a maximum that the point spread function has at the layer boundary surface (30) relative to the width of the same (Continued)

maximum that the point spread function has at the layer top side (28), at the lateral point, and determining the thickness and refractive index of the layer (6) at the lateral point from the apparent thickness and the widening.

8 Claims, 2 Drawing Sheets

(51) Int. Cl.
    *G01N 21/41*     (2006.01)
    *G02B 21/00*     (2006.01)

(56) References Cited

U.S. PATENT DOCUMENTS

| | | | |
|---|---|---|---|
| 2004/0085544 A1 | 5/2004 | De Groot | |
| 2006/0018234 A1 | 1/2006 | Sugi et al. | |
| 2012/0038977 A1 | 2/2012 | Bordenyuk | |
| 2012/0044501 A1* | 2/2012 | Oikaze | G01B 11/0675 356/503 |
| 2012/0229784 A1 | 9/2012 | Rocktaeschel et al. | |
| 2019/0033054 A1* | 1/2019 | Vaupel | G01B 11/0625 |
| 2021/0180946 A1* | 6/2021 | Kim | G01N 21/8422 |

FOREIGN PATENT DOCUMENTS

| | | |
|---|---|---|
| CN | 102498419 A | 6/2012 |
| CN | 103109152 A | 5/2013 |
| CN | 106079761 A | 11/2016 |
| DE | 10321885 A1 | 12/2004 |
| EP | 0 814 318 A2 | 12/1997 |
| JP | 2002 323 659 A | 11/2002 |

OTHER PUBLICATIONS

Kim, Do-Hyun, et al.; "A Thickness Measurement Method for Biological Samples Using Lensed-Fiber Sensors"; Proc. of SPIE 2011; 7894:789416-1-789416-8.

Sung, Li-Piin, et al.; "Use of laser scanning confocal microscopy for characterizing changes in film thickness and local surface morphology of UV-exposed polymer coatings"; Journal of Coatings Technology and Research 2004; 1 (4):267-276.

Chinese Examination Procedure Search Results for CN 201980048346X dated Dec. 1, 2021.

\* cited by examiner

METHOD FOR DETERMINING THE THICKNESS AND REFRACTIVE INDEX OF A LAYER USING A SHAPE FEATURE DURING ANALYSIS

RELATED APPLICATIONS

The present application is a U.S. National Stage application of International PCT Application No. PCT/EP2019/069211 filed on Jul. 17, 2019, which claims priority benefit of German Application No. DE 10 2018 117 470.5 filed on Jul. 19, 2018, the contents of each are incorporated by reference in their entirety.

FIELD OF THE INVENTION

The method relates to a method for determining the thickness and refractive index of at least one layer located on a substrate.

BACKGROUND OF THE INVENTION

Measuring the layer thickness is a common task. As a rule, the refractive index of the layer has to be known for an optical layer thickness measurement. In the prior art, the latter must be ascertained in a separate measurement method. By way of example, the refractive index of the layer material can be determined from an optical measurement at a point of the known layer thickness and can be extracted for the layer thickness measurement at a different point.

If interference effects are used to optically measure the layer thickness, spectrally resolved reflection measurements need to be carried out, as a rule, in the prior art so that both the refractive index and layer thickness can be determined from the position of at least three local extrema. The spectrally resolved measurement is complicated from a technical point of view, especially since the necessary spectral resolution is very high. Since there is a wavelength difference in the denominator of the calculation formula that is used, there is moreover the need for the wavelengths employed to differ as much as possible. This increases the technical outlay. Ellipsometry is a further option for the ascertainment of the layer thickness and refractive index. US 2004/0085544 A1 has disclosed an ellipsometric method for the purposes of characterizing layers and ascertaining refractive index and layer thickness in the process. A similar approach is explained in EP 0814318 A2. However, this also requires a spectrally resolved measurement and, moreover, a multiplicity of assumptions about the sample.

JP 2002-323659 A has disclosed a confocal optical system and a scanning confocal microscope using said system.

SUMMARY OF THE INVENTION

The invention is based on the object of specifying a method for determining the layer thickness and refractive index of a sample, which does not require spectral analysis.

The invention is defined in claim 1. The dependent claims relate to preferred developments.

In the method, the thickness and refractive index of a layer are determined at least one lateral location situated on a substrate. The layer has two surfaces, specifically a layer bottom side facing the substrate and a layer top side facing away from the substrate. This layer top surface can be an exposed surface, although this need not be the case. Thus, the layer can be a constituent part of a multilayer system and, in particular, can also be an inner layer. The layer is imaged at a plurality of axial positions along an optical axis in confocal microscopic fashion. A respective intensity distribution along the optical axis is captured from these image representations of the two faces, e.g., the point spread function (also referred to as "z-PSF" below). To this end, the z-position of the object plane is varied around the face, for example imaged at at least three axial positions of the object plane. The axial distance, i.e., the difference between a first axial relative position of a main or secondary maximum of the intensity distribution at the layer top side and a second axial relative position of the same main or secondary maximum at the layer bottom side, encodes an apparent thickness of the layer. Moreover, there is a comparison of a shape feature between the intensity distributions, which shape feature has different values of the layer top side and layer bottom side. This then allows ascertainment of the thickness and refractive index of the layer.

One option for this shape feature is a broadening of the same maximum in each case. Another is the spacing of respectively the same maxima.

A width of a maximum (e.g., the main maximum) is evaluated in the first option. A relative broadening of the intensity distribution, e.g., of the point spread function, is determined, specifically in relation to a width which the same maximum has at the other layer interface.

A spacing of maxima present in the intensity distributions is evaluated in the second option. Here, this can be a distance between a main maximum and a secondary maximum or a distance between secondary maxima. A relative value is also formed in this case by virtue of determining the change between the spacing of the maxima occurring in the second point spread function relative to the spacing of the same maxima of the first point spread function at the layer top side.

In further options, it is possible to use the relative intensity of secondary maxima or else the side on which the maxima are situated.

Each option corresponds to an exemplary embodiment.

What is decisive is that a calibration curve can be determined on the specific confocal system. Which shape features are the most suitable may depend, for example, on the numerical aperture of the objective or else on the wavelength.

The invention exploits the circumstance that the apparent thickness is given by the spacing of, for example, the main maxima of the axial intensity distribution at the two faces. This apparent layer thickness can be converted into the actual layer thickness if the refractive index is known. The relative change of a shape feature of the intensity distribution, e.g., the width of the main maximum of the intensity distribution, for the layer top side and layer bottom side allows the refractive index to be ascertained. The intensity distribution is narrower, for example diffraction-limited, at the layer top side. By contrast, light reflected at the layer bottom side exhibits an intensity distribution with significant distortions and hence modified shape features, for example as a result of spherical aberrations. A priori, one could not assume that these altered shape features allow ascertainment of the refractive index. However, the inventors have recognized that the width of the intensity distribution increases with the layer thickness, albeit not proportionally with the layer thickness. By contrast, the apparent layer thickness is proportional to the layer thickness. This becomes particularly clear if the dependence on the other parameter, specifically on the refractive index, is considered: The apparent layer thickness is inversely proportional to the refractive index, i.e., it decreases with increasing refractive index. By contrast, the imaging aberration and hence also the width of the intensity distribution, for example, increase with increasing refractive index (albeit not necessarily proportionately).

If an apparent layer thickness of 100 µm is measured (spacing of the main maxima) for a layer, then this value can be caused, for example, by a 150 µm thick glass layer with n=1.5 or else by a 200 µm layer with n=2. It is not possible to distinguish there between without considering the shape of the intensity distribution. If the width is considered, the latter rises both due to the increase in the real thickness (from 150 µm to 200 µm) and due to the increase of the refractive index from 1.5 and 2.0. Thus, the intensity distribution must be very significantly wider (the extent of which depends on the optical parameters such as numerical aperture, for example).

What follows therefrom is that the two measured quantities, specifically the difference in the axial relative position (apparent layer thickness) and altered shape feature, e.g., broadening of the maximum, are independent of one another and consequently allow the ascertainment of two independent physical parameters, specifically the (actual) layer thickness and the refractive index.

A particular advantage of the method lies in the fact that it can be carried out using existing confocal microscopes without technical changes in the optics or illumination. In particular, the simultaneous measurement of layer thickness and refractive index is possible using a single monochromatic light source.

Naturally, the method can be repeated at various lateral locations in order to obtain a lateral characterization of the layer thickness and refractive index of the layer. As a result, imaging can be obtained. It is also possible to analyse layer of a multilayer system. In this way, such a system can be analysed layer-by-layer in respect of thicknesses and refractive indices of the layers.

A particularly simple conversion of the broadening (or of the change in the spacing of the maxima) into the layer thickness and refractive index can be obtained for a given objective by means of a conversion curve. This conversion curve can either be determined experimentally in advance or be calculated from optical simulations.

Ascertaining the axial relative positions of the main or secondary maximum and the values of the shape feature of the intensity distribution at the layer bottom side and layer top side can respectively comprise the recording of a so-called z-stack. This is understood to mean that the confocal imaging is carried out at the lateral location with different axial focus positions. In its minimum embodiment, the z-stack comprises three different axial positions. Additionally, use can optionally also be made of a model shape curve for the intensity distribution in order to reconstruct the intensity distribution from the values of the z-stack. By way of example, this model shape curve can be based on the optical behavior of the imaging system, which is ascertained, for example, at a mirror face in a reference measurement; by way of example, this can already be implemented in the factory during the production of the apparatus by means of which the confocal imaging is carried out.

However, the axial relative positions of the main or secondary maximum can also be ascertained without a z-stack, specifically by a continuous displacement of the axial relative position of the confocal image representation, i.e., the object plane from which the confocal imaging is implemented. This allows the intensity maximum to be easily found.

The ascertainment of the value of the shape feature can equally be carried out without a z-stack, for example by virtue of approaching two z-positions, which are chosen to be symmetric with respect to the ascertained axial relative position of the maximum, and the intensity values of the associated positions being obtained therefrom. In embodiments, these values can already suffice to capture the value of the shape feature with a sufficient accuracy or to serve as a value of the shape feature themselves.

It is understood that the features specified above and the features yet to be explained below can be used not only in the specified combinations, but also in other combinations or on their own, without departing from the scope of the present invention.

The invention is explained in even more detail below on the basis of exemplary embodiments, with reference being made to the appended drawings, which likewise disclose features essential to the invention. These exemplary embodiments are only illustrative and should not be construed as restrictive. By way of example, a description of an exemplary embodiment with a multiplicity of elements or components should not be construed as meaning that all of these elements or components are necessary for implementation. Rather, other exemplary embodiments can also contain alternative elements and components, fewer elements or components or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times.

DESCRIPTION OF THE EMBODIMENTS OF THE INVENTION

Figure 1:
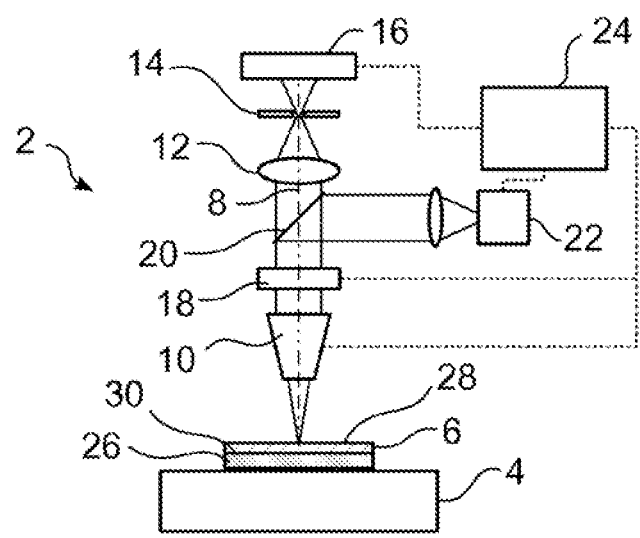
FIG. 1 is a schematic illustration of a confocal microscope.

FIG. 1 schematically shows a confocal microscope 2, by means of which a layer 6 arranged on a sample stage 4 is analysed, i.e., measured, in respect of layer thickness and refractive index. The confocal microscope 2 images the layer 6 in reflected light microscopy along an optical axis 8. To this end, it comprises an objective 10 and a tube lens 12 disposed downstream thereof, which undertake confocal imaging by means of the pinhole 14 and capture the radiation detected in confocal fashion by means of a detector 16. A scanner 18 displaces the lateral location, from where the radiation is detected in confocal fashion, transversely with respect to the optical axis 8 over the layer 6. By adjusting the objective 10 or the sample stage 4, it is moreover possible to adjust the z-coordinate, i.e., the object plane to which a plane, in which the pinhole 14 is located, is conjugate, along the optical axis 8. The layer 6 is illuminated by way of a beam splitter 20, which is disposed downstream of the scanner 18 in the imaging direction and which input couples illumination radiation from a light source 22. The entire microscope 2 is controlled by a controller 24, which is connected to the corresponding units by way of control lines plotted in dashed fashion. The illustration of FIG. 1 shows a variant in which the depth adjustment, i.e., the adjustment along the optical axis 8, is implemented by an adjustment of the objective 10. This is purely exemplary.

The layer 6 is situated above or (as illustrated) directly on a substrate 26 and has a layer bottom side 30 assigned to the substrate 26 and a layer top side 28 that faces the objective 10 and hence faces away from the substrate 26.

The confocal microscope 2 is embodied as a reflected light microscope, which has a scanning configuration in the structure illustrated. However, these properties are optional. Especially if the refractive index and layer thickness should only be ascertained at one location of the layer 6, the microscope 2 can also be configured without the scanner 18.

Figure 2:
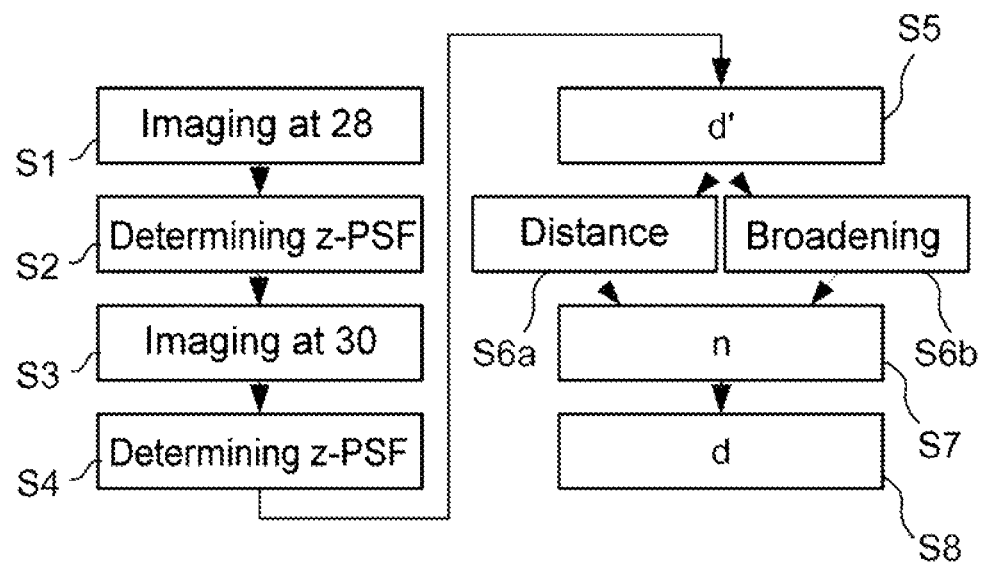
FIG. 2 is a flowchart for a method for measuring the thickness and refractive index of a layer using the microscope of FIG. 1, and FIGS. 3A to 4B show z-PSFs which are used in the method illustrated in FIG. 2.

To ascertain the layer thickness d of the layer 6 and the refractive index n of the layer 6, the method illustrated schematically in FIG. 2 is carried out. In a step S1, the layer 6 is imaged in confocal fashion from one location, e.g., in the case of a fixed setting of the optional scanner 18, wherein the depth setting along the optical axis 8 is set to the layer top side 28. Subsequently, the axial intensity distribution in the form of the z-PSF is determined at the layer top side 28 in a step S2. To this end, the intensity is determined in a z-stack around the layer top side 28 for a plurality of z-positions, e.g., three, five or more positions. The relative z-position of the layer top side 28 can be ascertained in advance on the basis of the refractive index jump that is present there, which causes a reflection, and so it can be approached approximately.

Figure 3A:
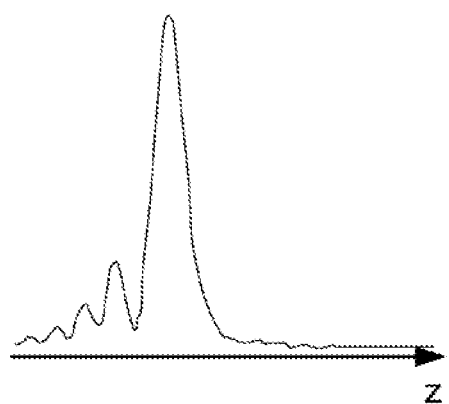

The curve profile obtained in this way for the z-PSF is shown in FIG. 3A. The z-PSF is shown as a curve of a main maximum and subordinate secondary maxima and arises from the aforementioned z-variation along the optical axis 8.

Figure 3B:
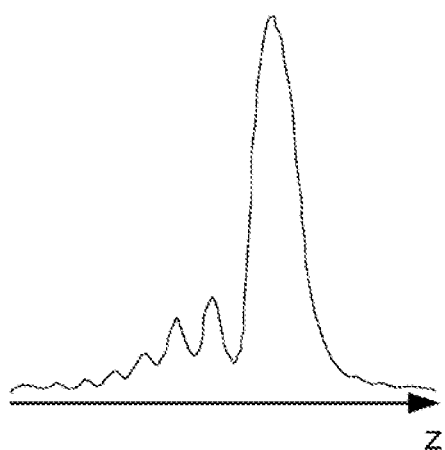

Subsequently, the layer 6 is imaged at the layer bottom side 30 in a step S3. The z-PSF is also determined in this respect. This is implemented in a step S4. The z-PSF obtained is shown in FIG. 3B.

The distance between the same maxima in the z-PSF for the two faces, specifically the layer top side 28 and the layer bottom side 30, yields an apparent layer thickness d'. The latter is ascertained in a step S5. Expediently, the main maximum is used here.

Now, the extent to which the z-PSFs at the layer bottom side 30 and the layer top side 28 differ is evaluated. To this end, there are two alternatives.

In one variant I, the distance between the same maxima in the z-PSF is evaluated in respect of relative change in a step S6a. The distance between two selected maxima of the z-PSF at the layer bottom side 30 is related to the spacing of the same maxima of the z-PSF at the layer top side 28. Here, the term "the same maxima" should be understood to mean that the functionally same distance is measured, i.e., for example, in both cases the distance between the main maximum and the first secondary maximum or between the main maximum and the second secondary maximum or between the first secondary maximum and the second secondary maximum, etc.

The broadening of the same maximum is ascertained in a step S6b, for example the broadening of the main maximum. Here, too, a relative value is once again obtained, i.e., the width of the selected maximum at the layer bottom side 30 is related to the width of the same maximum of the z-PSF at the layer top side 28.

One of the two variants is carried out, i.e., either step S6a or step S6b. Both variants allow ascertainment of the refractive index n and the (actual) layer thickness d of the layer 6 in a step S7 from the ascertained relative value and the apparent layer thickness d'. Instead of the one-part step S7, a stepped approach is also possible, in which the refractive indices are ascertained first, followed by the layer thickness d, from the relative values and the apparent layer thickness d'.

A conversion curve can be used when carrying out step S7, said curve being provided before the step is carried out. By way of example, the conversion curve specifies the relationship between n and relative change of distance or broadening or immediately specifies the relationship between n and d and relative distance or broadening and apparent layer thickness d'. The conversion curve can either be calculated for the specific objective 10 from optical simulations or else be ascertained experimentally for the specific objective 10.

Figure 4A:
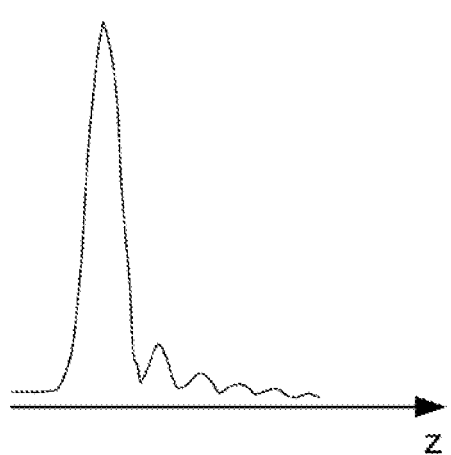
Figure 4B:
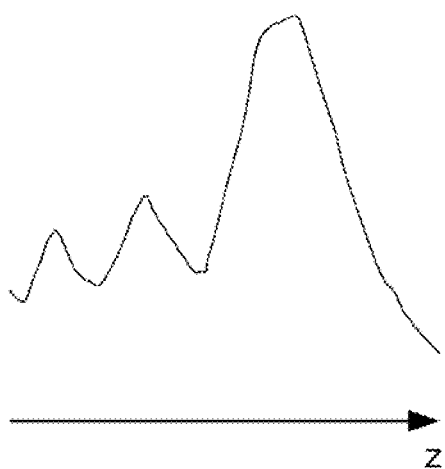

Knowing the property of the objective is relevant when carrying out step S7 since the broadening or the change in distance between the maxima depends on the objective. This becomes clear from the difference between, firstly, FIGS. 3A/3B and, secondly, 4A/4B. FIGS. 4A and 4B show the z-PSF at the layer top side 28 and layer bottom side 30, respectively, as do FIGS. 3A and 3B. However, FIGS. 3A/B and FIG. 4A/B differ in respect of the thickness of the layer and the objective properties. The curves of FIGS. 3A and 3B were obtained from a 1 mm thick, mirrored glass layer using a 10×/0.25 objective while the curves of FIGS. 4A and 4B were obtained at a layer in the form of a 0.17 mm thick cover slip on a mirroring surface as substrate 26. Here, a 50×/0.7 objective was used to this end. It is possible to see that the broadening effects are particularly pronounced for objectives with a high numerical aperture.

Since the broadening of the z-PSF or the change of the distance between the maxima of the z-PSF depends on the properties of the objective, provision is naturally made for the same objective to always be used in the method. Additionally, it should always be left in the same setting, for example in respect of a correction ring, etc., with regard to its optical imaging properties during the measurement at the faces 28 and 30.

Imaging in respect of the layer thickness profile and refractive index profile of the layer 6 can also be obtained using the above-described method, specifically if the method is carried out for various lateral locations, for example the appropriate adjustment of the scanner 18. In the process, it is naturally possible to initially scan the layer top side 28 with a z-setting and subsequently scan the layer interface 30 with a z-setting. As a rule, this procedure should be faster since conventional scanners 18 operate more quickly than a z-adjustment on the objective 10 or the sample stage 4.

Equally, a layer system made of a plurality of layers can be analysed layer-by-layer.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for determining the thickness and refractive index of a layer situated on a substrate, wherein the layer has a layer bottom side facing the substrate and a layer top side facing away from the substrate, comprising:

a) setting a lateral location of the layer, b) carrying out confocal microscopic imaging of the layer at the lateral location and at a plurality of axial positions along an optical axis, c) ascertaining a first axial relative position of a main or secondary maximum of an axial intensity distribution at the layer bottom side for the lateral location and ascertaining a second axial relative position of the same main or secondary maximum of an intensity distribution at the layer top side for the lateral location, d) determining a first value of a shape feature of the intensity distribution at the layer bottom side for the lateral location and a second value of the same shape feature of the intensity distribution at the layer top side for the lateral location, and e) determining the thickness and refractive index of the layer at the lateral location from a difference between the first and second axial relative position and a difference between the first and second value of the shape feature, wherein the shape feature comprises a distance between two maxima present in the intensity distribution such that the ascertainment of the difference between the first and second value of the shape feature comprises ascertaining of a change of a distance between maxima, and/or wherein the shape feature comprises an intensity ratio of maxima present in the intensity distribution such that the ascertainment of the difference between the first and second value of the shape feature comprises ascertaining of a change of the intensity ratio between maxima.

2. The method as claimed in claim 1, wherein a z-stack with at least three axial positions at the lateral location is respectively recorded in step c) and/or step d) at the layer top side and the layer bottom side.

3. The method as claimed in claim 1, wherein a width of the main or secondary maximum is determined as shape feature in step d).

4. The method as claimed in claim 1, wherein, in order to carry out steps c) and d), a first point spread function that is resolved along the optical axis is determined at the layer bottom side and a second point spread function that is resolved along the optical axis is determined at the layer top side, in each case at the lateral location, and the point spread functions are used as intensity distributions.

5. The method as claimed in claim 1, wherein the method is repeated for various lateral locations of the layer in order to ascertain, in scanning fashion, a lateral distribution of the refractive index and layer thickness.

6. The method as claimed in claim 1, wherein an objective is used for confocal microscopic imaging and a conversion curve is provided for this objective, said conversion curve specifying the refractive index of the layer as a function of the difference between the first and second axial position and the difference between the first and second value of the shape feature.

7. The method as claimed in claim 1, wherein the layer is part of a multilayer system.

8. The method as claimed in claim 7, wherein the layer is an inner layer in the multilayer system.

* * * * *

UNITED STATES PATENT AND TRADEMARK OFFICE
CERTIFICATE OF CORRECTION

| | | |
|---|---|---|
| PATENT NO. | : 11,371,831 B2 | Page 1 of 1 |
| APPLICATION NO. | : 17/260356 | |
| DATED | : June 28, 2022 | |
| INVENTOR(S) | : Langholz et al. | |

It is certified that error appears in the above-identified patent and that said Letters Patent is hereby corrected as shown below:

On the Title Page

Title now reads: "Method for Determining the Thickness and Refractive Index of a Layer Using a Shape Feature During Analysis"
Should read -- Method for Determining the Thickness and Refractive Index of a Layer --

In the Specification

Column 1, Lines 1-4 now read: "Method for Determining the Thickness and Refractive Index of a Layer Using a Shape Feature During Analysis"
Should read -- Method for Determining the Thickness and Refractive Index of a Layer --

Signed and Sealed this
Twenty-seventh Day of September, 2022

Katherine Kelly Vidal
*Director of the United States Patent and Trademark Office*